Patented Apr. 20, 1926.

1,581,446

UNITED STATES PATENT OFFICE.

WILLIAM HOXIE, OF WHITE PIGEON, MICHIGAN, ASSIGNOR TO HENRY S. GEERY, OF STAMFORD, CONNECTICUT.

FLUX.

No Drawing. Application filed May 26, 1924, Serial No. 715,922. Renewed December 3, 1925.

*To all whom it may concern:*

Be it known that I, WILLIAM HOXIE, a citizen of the United States, residing in White Pigeon, in the county of St. Joseph, in the State of Michigan, have invented certain new and useful Improvements in Flux, of which the following is a specification.

This invention relates to a composition of matter in the nature of a flux or welding compound.

The object of the invention is to provide a composition of matter which shall have wide application to various metals as a flux, for welding, brazing or soldering purposes. The invention also seeks to provide a composition or flux which will be capable of effective use upon oily or greasy metallic surfaces without the necessity of cleaning them.

In carrying out the invention a compound is formed composed of borax, oxide of iron, bicarbonate of soda and sal ammoniac. In the preferred embodiment of the invention a major proportion of borax and minor proportions of oxide of iron (Venetian red), bicarbonate of soda and sal ammoniac are pulverized and thoroughly mixed in a dry state so as to form a fairly even mixture.

A typical composition which is known to give the desired results is:

| | Per cent by weight. |
|---|---|
| Borax | 80 |
| Oxide of iron | 10 |
| Bicarbonate of soda | 5 |
| Sal ammoniac | 5 |

In use the metallic surfaces to be welded, brazed or soldered are covered with the compound in the manner usual with other welding compounds or fluxes. The invention may, in some circumstances, also be found advantageous as a flux in the smelting of metals.

The compound has a wide application and can be effectively used with all metals. It is found that it will not only aid in welding and brazing, but will refine and toughen all metals at the welded surfaces and will permit a perfect junction of the welded surfaces to be obtained. The compound will effectively restore burnt steel and will enable metals to withstand a greater degree of heat. It will facilitate the tinning of a soldering iron in an unappreciable period of time. It has been found to improve the grain in aluminum castings. It has also been found to permit perfect welding or brazing with dirty, oily or greasy surfaces, thereby obviating the necessity of cleaning such surfaces before they can be effectively worked on.

While it cannot be said with certainty what particular effect the ingredients have upon each other or what effect each contributes to the results obtained by the mixture as a whole, nevertheless it has been ascertained that the mixture of the ingredients hereinbefore set forth in the proportions indicated give a welding compound which is superior in every respect to borax when used alone or to any other known combination of ingredients heretofore used in this capacity. Furthermore, any deleterious effects which in certain circumstances may be found to result with the use of borax alone are overcome with the present compound.

It is to be understood that the percentages of the various ingredients hereinbefore recited as going to form the flux according to the present invention are given as examples only and that variations from the exact proportions within prescribed limits are to be deemed within the spirit and scope of the invention, no limitation being intended except as indicated in the appended claims.

What I claim is:

1. A flux comprising borax, oxide of iron, bicarbonate of soda and sal ammoniac.

2. A flux consisting of a major proportion of borax, and minor proportions of oxide of iron, bicarbonate of soda and sal ammoniac.

3. A flux consisting of eighty percent borax, ten percent oxide of iron, five percent bicarbonate of soda and five percent sal ammoniac.

4. As a composition of matter, a welding and brazing compound consisting of the following ingredients pulverized and intimately mixed in the following proportions: borax, 80%; oxide of iron, 10%; bicarbonate of soda, 5%; and sal ammoniac, 5%.

5. A flux comprising borax, Venetian red, bicarbonate of soda and sal ammoniac.

6. A flux comprising a major proportion of borax and a minor proportion of Venetian red, bicarbonate of soda and sal ammoniac.

7. A flux comprising eighty percent borax, ten percent Venetian red, five percent bicarbonate of soda and five percent sal ammoniac.

8. As a composition of matter, a welding and brazing compound consisting of the following ingredients pulverized and intimately mixed in the following proportions: borax, 80%; Venetian red, 10%; bicarbonate of soda, 5%, and sal ammoniac 5%.

This specification signed this 22d day of May, A. D. 1924.

WILLIAM HOXIE.